(12) United States Patent
Amireddy et al.

(10) Patent No.: US 11,762,450 B2
(45) Date of Patent: *Sep. 19, 2023

(54) USB TYPE-C SUBSYSTEM POWER MANAGEMENT

(71) Applicant: Intel Corporation, Santa Clara, CA (US)

(72) Inventors: Sindhu Amireddy, Hillsboro, OR (US); Brent Bero, Portland, OR (US); Deepak Rangaraj, Austin, TX (US); Patrick Maloney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,619

(22) Filed: May 16, 2022

(65) Prior Publication Data

US 2022/0276693 A1 Sep. 1, 2022

Related U.S. Application Data

(63) Continuation of application No. 16/911,308, filed on Jun. 24, 2020, now Pat. No. 11,360,543.

(51) Int. Cl.
*G06F 1/32* (2019.01)
*G06F 1/3287* (2019.01)
(Continued)

(52) U.S. Cl.
CPC ............ *G06F 1/3287* (2013.01); *G06F 1/266* (2013.01); *G06F 1/3218* (2013.01);
(Continued)

(58) Field of Classification Search
CPC .... G06F 1/3287; G06F 1/3218; G06F 1/3296; G06F 13/4081; G06F 13/4022; G06F 1/266; G06F 2213/0042; G06F 2213/0038
(Continued)

(56) References Cited

U.S. PATENT DOCUMENTS 9,215,491 B1* 12/2015 Yeh .................. H04N 21/42607
9,952,986 B2* 4/2018 Pethe .................. G06F 13/4282
(Continued)

OTHER PUBLICATIONS

Non-Final Office Action dated Oct. 4, 2021 for U.S. Appl. No. 16/911,308, 10 pages.
(Continued)

*Primary Examiner* — Volvick Derose
(74) *Attorney, Agent, or Firm* — Schwabe, Williamson & Wyatt, P.C.

(57) ABSTRACT

Hardware-based wake detection and system-on-chip (SoC) firmware support for servicing fixed display port (DP) and High Definition Multimedia Interface (HDMI) port hot plug events which allow a Universal Serial Bus (USB) Type-C subsystem to go into a powered off state while the fixed display is not streaming. Upon receiving a display software-initiated wake for fixed display streaming in response to a hot plug detect, the SoC USB Type-C firmware triggers exit low-power state flow to power up the USB USB Type-C subsystem to handle the display traffic. The SoC USB Type-C firmware has the capability to autonomously re-enter the low power state when the fixed display(s) are not streaming.

20 Claims, 4 Drawing Sheets

(51) Int. Cl.
*G06F 1/3296* (2019.01)
*G06F 1/3218* (2019.01)
*G06F 13/40* (2006.01)
*G06F 1/26* (2006.01)
*G06F 1/3203* (2019.01)

(52) U.S. Cl.
CPC ........ *G06F 1/3296* (2013.01); *G06F 13/4022* (2013.01); *G06F 13/4081* (2013.01); *G06F 1/3203* (2013.01); *G06F 2213/0038* (2013.01); *G06F 2213/0042* (2013.01)

(58) Field of Classification Search
USPC ........................................................ 713/323
See application file for complete search history.

(56) References Cited

U.S. PATENT DOCUMENTS

| | | | | |
|---|---|---|---|---|
| 2005/0160196 A1* | 7/2005 | Dutton | ............... | G06K 19/0701 710/10 |
| 2007/0117533 A1* | 5/2007 | Han | ................. | H04W 52/0229 455/343.1 |
| 2007/0165038 A1* | 7/2007 | Chiba | .................... | G06F 21/10 345/520 |
| 2012/0159032 A1* | 6/2012 | Onuki | ...................... | G06F 3/14 710/305 |
| 2013/0244491 A1* | 9/2013 | Sarwar | ................ | H01R 31/005 439/655 |
| 2014/0026137 A1* | 1/2014 | Vembu | .................. | G06F 9/4881 718/102 |
| 2014/0208134 A1* | 7/2014 | Waters | ................ | G06F 13/4282 713/310 |
| 2014/0327833 A1* | 11/2014 | Kabuto | ............ | H04N 21/44231 348/730 |
| 2016/0117793 A1* | 4/2016 | Sierra | ................... | G06F 3/1438 345/502 |
| 2016/0246348 A1* | 8/2016 | Ambapuram | ........... | G06F 1/329 |
| 2017/0017595 A1* | 1/2017 | Schnell | ............... | G06F 13/4286 |
| 2017/0177069 A1* | 6/2017 | Bedare | ..................... | G06F 1/263 |
| 2017/0242804 A1* | 8/2017 | Voor | ....................... | G06F 3/023 |
| 2018/0054557 A1* | 2/2018 | Kim | ....................... | H04N 23/64 |
| 2019/0042523 A1* | 2/2019 | Ismail | ................... | G06F 13/385 |
| 2019/0043411 A1* | 2/2019 | Chaudhari | ........... | G09G 3/2092 |
| 2019/0102334 A1* | 4/2019 | Berchanskiy | ............. | G06F 3/14 |
| 2020/0081508 A1* | 3/2020 | Kobayashi | ....... | H04N 21/43632 |
| 2020/0225722 A1* | 7/2020 | Nge | ........................ | G06F 1/3293 |
| 2020/0233263 A1* | 7/2020 | Liu | ....................... | G09G 3/3258 |
| 2020/0272592 A1* | 8/2020 | Chan | ................... | G06F 13/4282 |
| 2021/0124403 A1* | 4/2021 | Park | ........................ | G06F 3/011 |
| 2021/0405090 A1* | 12/2021 | Zhao | ................ | G01R 31/31709 |

OTHER PUBLICATIONS

Notice of Allowance dated Feb. 22, 2022 for U.S. Appl. No. 16/911,308, 5 pages.

* cited by examiner

USB TYPE-C SUBSYSTEM POWER MANAGEMENT

RELATED APPLICATIONS

This application is a continuation of U.S. patent application Ser. No. 16/911,308, entitled "USB TYPE-C SUBSYSTEM POWER MANAGEMENT" filed on Jun. 24, 2020, and claims priority to the Ser. No. 16/911,308 application. The entire contents of the Ser. No. 16/911,308 application is incorporated herein by reference.

BACKGROUND

Processor systems with integrated Universal Serial Bus (USB) Type-C ports, in a USB subsystem, having a fixed Display Port (DP) or High-Definition Multimedia Interface (HDMI) port configuration, prevent the USB Type-C subsystem of the processor system from achieving the lowest power state, even if there is no display device attached on these USB Type-C ports.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
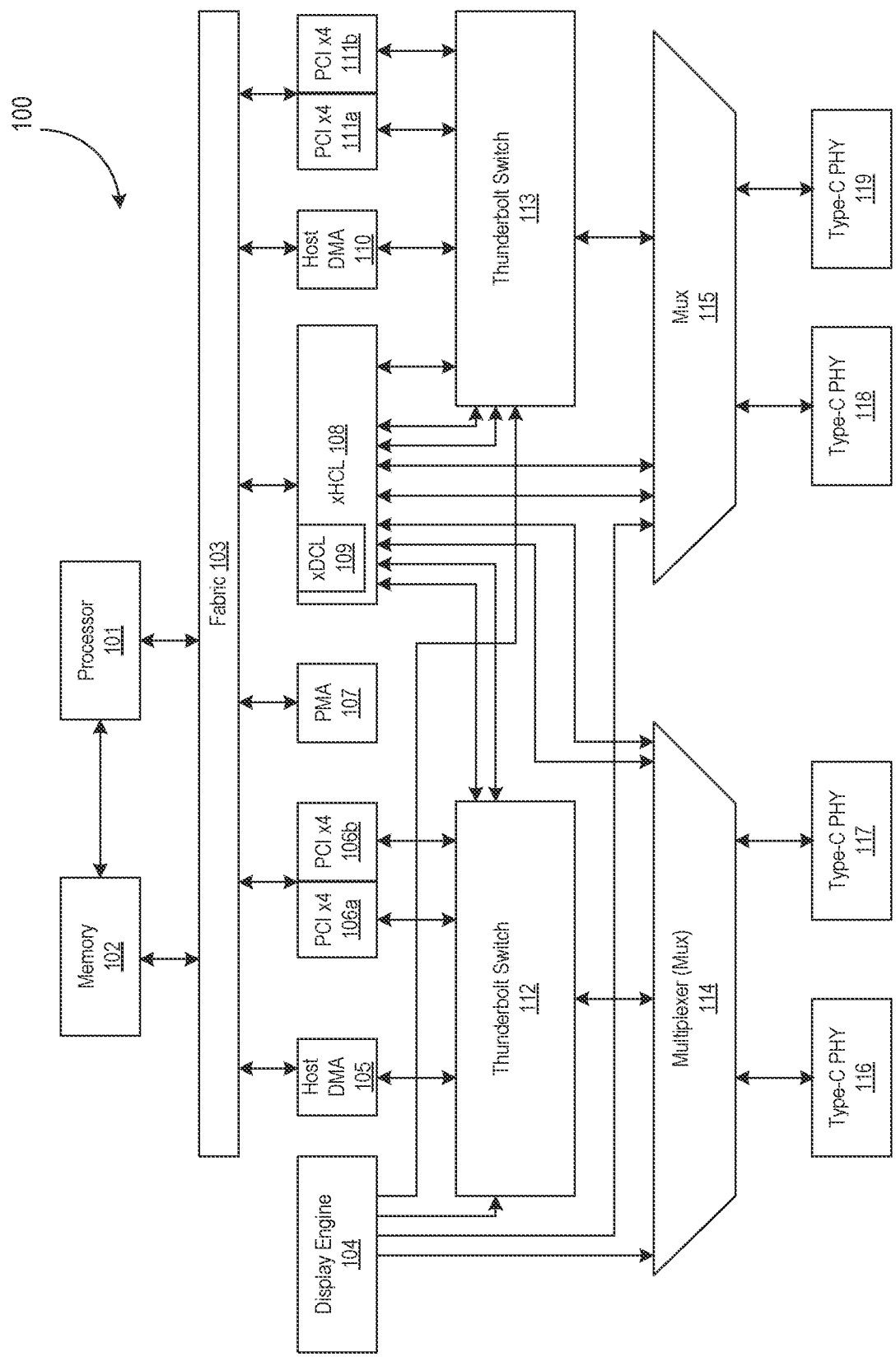
FIG. 1 illustrates a Universal Serial Bus (USB) Type-C subsystem with power management, in accordance with some embodiments.

Various embodiments provide a hardware-based wake detection and system-on-chip (SoC) firmware (software) support for servicing fixed display port (DP) and High Definition Multimedia Interface (HDMI) port hot plug events which allow a Universal Serial Bus (USB) Type-C subsystem to go into a powered off state (e.g., D3COLD) while the fixed display is not streaming. Upon receiving a display software-initiated wake for fixed display streaming in response to a hot plug detect on the USB Type-C port, the SoC USB Type-C firmware triggers exit low-power state flow to power up the USB Type-C subsystem to handle the display traffic. The SoC USB Type-C firmware has the capability to autonomously re-enter the low power state when the fixed display(s) are not streaming.

In some embodiments, an apparatus is provided which comprises a display engine to generate an interrupt to a device driver in response to a display device being coupled to a port (e.g., USB Type-C port), wherein the device driver is to issue a power request for the display device. The apparatus further comprises a power management agent to detect the power request and exit a low power state (e.g., D3COLD state) to an active state (e.g., S0 or D0 state). In some embodiments, the apparatus comprises a platform controller hub to detect a hot plug event in response to the display device being coupled to the port. In some embodiments, the platform controller hub is to forward the hot plug event to the display engine, wherein the display engine is to generate the interrupt in response to reception of the hot plug event from the platform controller hub. In some embodiments, the power management agent comprises a rising edge detection logic to detect assertion of the power request. In some embodiments, the power management agent comprises registers to mask output of the edge detection logic. In some embodiments, the power management agent includes a microcontroller to service an output of the edge detection logic to generate wakeup signal. In some embodiments, the microcontroller executes a software to generate the wakeup signal. In some embodiments, the display driver trains a display link of the display device in response to exit of the low power state. In some embodiments, the low power state is a D3COLD state, and wherein the active state is one of S0 or D0 states.

In some embodiments, a machine-readable storage media having machine readable instructions (e.g., USB Type-C subsystem software or firmware) stored thereon that when executed cause the microcontroller of the power management agent to perform a method comprising: receiving an edge detection of a power request signal, wherein the power request signal is generated by a device driver in response to a display device being coupled to a port; and processing the power request signal by exiting a low power state to an active state. In some embodiments, the method further comprises: generating a wakeup signal to wake up from the low power state, wherein the wakeup signal wakes up a USB Type-C subsystem.

There are many technical effects of various embodiments. For example, the power management scheme results in significant power savings. The USB Type-C complex on a processor system can more frequently enter low power state, a massively power gated state that brings, for example, 80 mW of power savings. This power savings accounts for approximately 2.8% to 3.5% battery life improvement and performance increases for graphics multi-threaded processes and single-threaded workloads by 1% and 0.37% respectively. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal.

The meaning of "a," "an," and "the" include plural references. The meaning of "in" includes "in" and "on."

The term "analog signal" here generally refers to any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates apparatus 100 with Universal Serial Bus (USB) Type-C subsystem with power management, in accordance with some embodiments. Integrated Type-C subsystem on a Client system-on-chip (SoC) comprises multiple intellectual property (IP) blocks. USB Type-C subsystem is coupled to processor(s) 101 and memory 102 via interconnect fabric 103. USB Type-C subsystem comprises controllers, switches, multiplexers and physical (PHY) I/Os. Display engine 104 is typically considered outside the USB Type-C subsystem, but is coupled to it. In some embodiments, the USB Type-C subsystem comprises host direct memory access (DMA) 105, first set of peripheral component interface (PCI) 106 (e.g., two groups of four PCIs 106a and 106b, respectively), power management or functional agent (PMA) 107, host controller (xHCI) 108, device controller (xDCI) 109, host direct memory access 110, second set of peripheral component interfaces 111a and 111b, Thunderbolt switches 112 and 113, multiplexers 114 and 115, and Type-C PHYs (e.g., IO circuitries) 116, 117, 118, and 119. While the embodiments are described with reference to four Type-C PHYs, the embodiments are not limited to any particular number of PHYs. For example, the embodiments are applicable to a single Type-C PHY, two Type-C PHYs, three Type-C PHYs, and more than four single Type-C PHYs.

Figure 4:
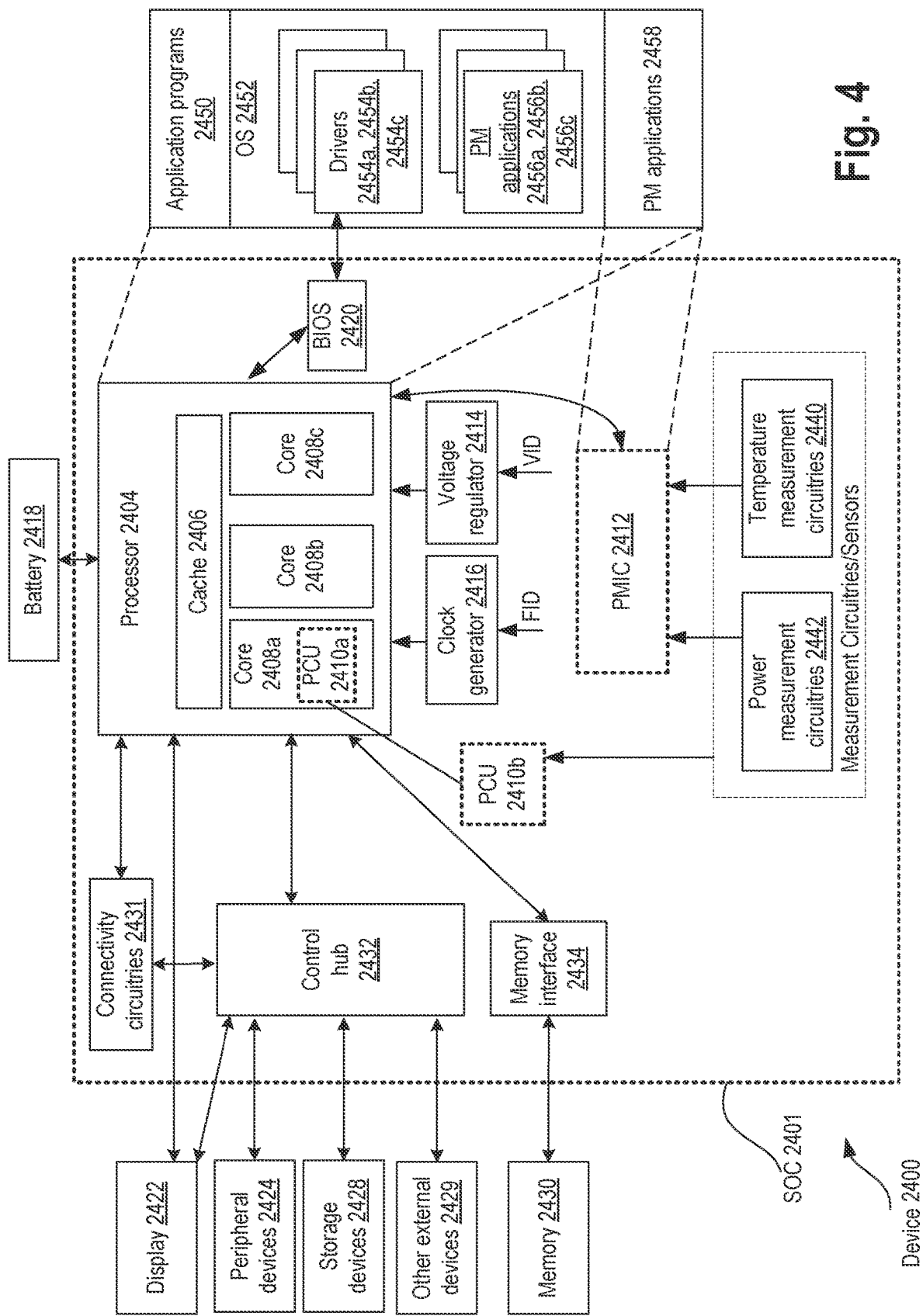
FIG. 4 illustrates a smart device or a computer system or an SoC (System-on-Chip) having USB Type-C subsystem power management, in accordance with various embodiments.

In some embodiments, processor 101 is any suitable processor such as SoC 2401 or processor 2404 of FIG. 4. In some embodiments, memory 102 is any suitable memory such as storage devices 2428 or memory 2430 of FIG. 4. In some embodiments, processor 101 is coupled to memory 102 via a memory interface 2434 of FIG. 4. Fabric 103 is a network of interconnects coupling processor 101 and/or memory 102 with the rest of the USB subsystem. Fabric 103 provides low latency and high-speed interconnect to couple the controllers of USB subsystem with processor 101 and/or memory 102. These controllers include host DMA 105, 110; PCIs 106a, 106b, 111a, 111b, xHCI 108, xDCI 109, and PMA 107. Thunderbolt switches 112 and 113 implement a tunneling protocol, which takes the PCI, USB (xHCI only, not xDCI), and Display (DP only, not HDMI) protocols, and time multiplexes them on a Thunderbolt Link.

In some embodiments, display engine 104 is part of a graphics engine. Display engine 104 may be external to a graphics processor or processor 101 and coupled to the graphics processor via a ring interconnect or any suitable fabric. Display engine 104 includes a 2D engine and a display controller. In some embodiments, display engine 104 contains special purpose logic capable of operating independently of a 3D pipeline. In some embodiments, the display controller couples with a display device (not shown) via Type-C PHYs, which may be a system integrated display device, as in a laptop computer, or an external display device attached via a display device connector (e.g., USB Type-C connector).

Multiplexers 114 and 115 provides access of various controller outputs to the Type-C PHYs 116-119. In some embodiments, multiplexers 114 and 115 are controlled by PMA 107 (also referred to as an IO manager (IOM)). PMA 107 controls the Type-C subsystem flows. The embodiments herein focus on the power management related flows of PMA 107. In various embodiments, PMA 107 comprises hardware (HW) state machines, logic blocks, and a microcontroller. PMA 107 is also controllable by software such as drivers (e.g., 2454 of FIG. 4), BIOS, and/or operating system (e.g., OS 2452 of FIG. 4). PMA 107 allows the USB subsystem to operate in various power states such as D1, D2, D3, and D3COLD states as defined by as defined by PCI Bus Power Management Interface (PCI) Specification and/or Advanced Configuration and Power Interface Specification (ACPI). Device power states D1, D2, D3, and D3COLD are the device low-power states.

Device power state D1 is the highest-powered device low-power state. Here, device refers to the USB Type-C subsystem. In D1 state, the power consumption is less than in the D0 state but greater than or equal to that in the D2 state. D0 state is an active device state. D1 power state is a clock-gated state. In D1 power state, the device receives just enough power to preserve the device's hardware context. In D1 state, device context is preserved by the hardware and may not be restored by the driver. In D1 state, drivers save and restore or reinitialize any context lost by the hardware. As such, D1 state is generally used by devices because resuming from this state may not involve the driver to restore the device's full hardware context.

Device power state D2 is an intermediate device low-power state between D1 and D3 power states. Generally, the power consumption of a device in D2 state is less than or equal to that in the D1 state. In D2 state, the device context is generally lost by the hardware. Frequently, D2 state preserves the part of the context that is used to signal wake events. In D2 state, device drivers save and restore or reinitialize any context lost by the hardware. A typical device loses most context when it enters D2. Restoring the device from D2 state to D0 state takes at least as long as restoring the device from D1 state to D0 state. In one example, a graphics adapter, that has a large frame buffer, is a device that has a large amount of hardware context to restore after a transition from D2 to D0. For such a device, the restore time from D2 might be much greater than the restore time from D1.

D3 state is the lowest-powered device low-power state. All devices must support this state. Starting with Windows 8 by Microsoft, the operating system subdivides D3 into two separate and distinct sub-states, D3HOT and D3COLD. Earlier versions of Windows define the D3 state, but not the D3HOT and D3COLD sub-states. However, all versions of the PCI Bus Power Management Interface (PCI) Specification defines separate D3HOT and D3COLD sub-states, and versions 4 and later of the Advanced Configuration and Power Interface Specification (ACPI) define D3HOT and D3COLD sub-states.

In D3COLD state, power is fully removed from the device and possibly from the entire system. In D3COLD state, a device driver is responsible for restoring device context. The driver preserves and then restores device context (e.g., typically from the most recent working configuration) or reinitializes the device upon transition to the D0 state. In D3COLD state, a device may be able to trigger a wake signal to wake a sleeping computer. A software-aware and managed low power state D3COLD in package C0/System S0 state allows the subsystem PMA 107 to power off all the USB Type-C IP's and recover power to SoC budget. D3COLD is a state in which all the Type-C controllers are put into PCIe specification defined D3Cold state by their drivers running in an operating system, thereby relinquishing any further access to the IP's. In some embodiments, BIOS communicates to PMA 107 about the software D3COLD state so that it can perform hardware actions and turn off the power to Type-C Controllers (e.g., 105-111) and PHYs 116-119.

Some embodiments implement a hardware-based wake detection in PMA 107 and provide SoC firmware support for servicing fixed display port (DP) and High Definition Multimedia Interface (HDMI) port hot plug events to PHYs 116-119 which allow the USB Type-C subsystem to go into a powered off state (e.g., D3COLD state) while the fixed display is not streaming. Upon receiving a display software-initiated wake for fixed display streaming in response to a hot plug detect, the SoC USB Type-C firmware triggers exit low-power state flow to power up the USB Type-C subsystem to handle the display traffic. The SoC USB Type-C firmware has the capability to autonomously re-enter the low power state when the fixed display(s) are not streaming.

Various embodiments allow the USB Type-C subsystem to autonomously enter and exit D3COLD state independent of package low power states, resulting in significant power savings for the processor system. In some embodiments, PMA 107 IP remains powered up in this D3COLD. While the embodiments are described with reference to D3COLD low power state, the embodiments provide a scheme (hardware and software) that is applicable to any low power state desired for the USB Type-C subsystem.

In some embodiments, an auxiliary power request signal (herein referred to as auxpwrreq) is asserted upon a hot plug detect wake event on the fixed DP/HDMI ports due to a display connection to the USB Type-C PHY. The hot plug detect wake event results in an interrupt that interrupts a display driver resulting in the assertion of auxpwrreq interface signal from display engine 104 (or display IP) to Type-C Subsystem. This interrupt is done to enable auxiliary channel in the PHY (e.g., 116-119) for transmitting/receiving DP protocol auxiliary commands with monitor. In some embodiments, an edge detection hardware logic is added to existing auxpwrreq status signal in the PMA 107. This allows for detection of hot plug detect activity on the fixed display/HDMI ports (e.g., 116-119).

In some embodiments, a display driver (e.g., software) is provided to enable auxpwrreq during the display connect flow. For static/fixed DP and HDMI ports that are created by repurposing Type-C PHYs 116-119, driver enables auxpwrreq during the connect flow which are not disabled until disconnect event is processed. After receiving the auxpwrreq, driver polls on an internal status register in the PHY to make sure it's fully initialized before starting AUX traffic.

In some embodiments, an auxpwrreq assertion detection logic (e.g., hardware) is added to PMA 107 to trigger a microcontroller to handle the event. The firmware running on the microcontroller brings the USB-C subsystem out of D3COLD state to a state where it is capable to handle the fixed display request and allow the connected monitor to light up. The D3COLD exit flow is driven by the USB-C PMA firmware and hardware to bring the USB-C subsystem back to a fully-on state, D0 state. In some embodiments, if D3COLD feature is enabled by software (e.g., BIOS), the USB-C subsystem opportunistically tries to re-enter the D3COLD low power state while the SoC is active (e.g., PkgC 0+D0 state) to reduce power, when there the fixed/static ports aren't used.

Figure 2:
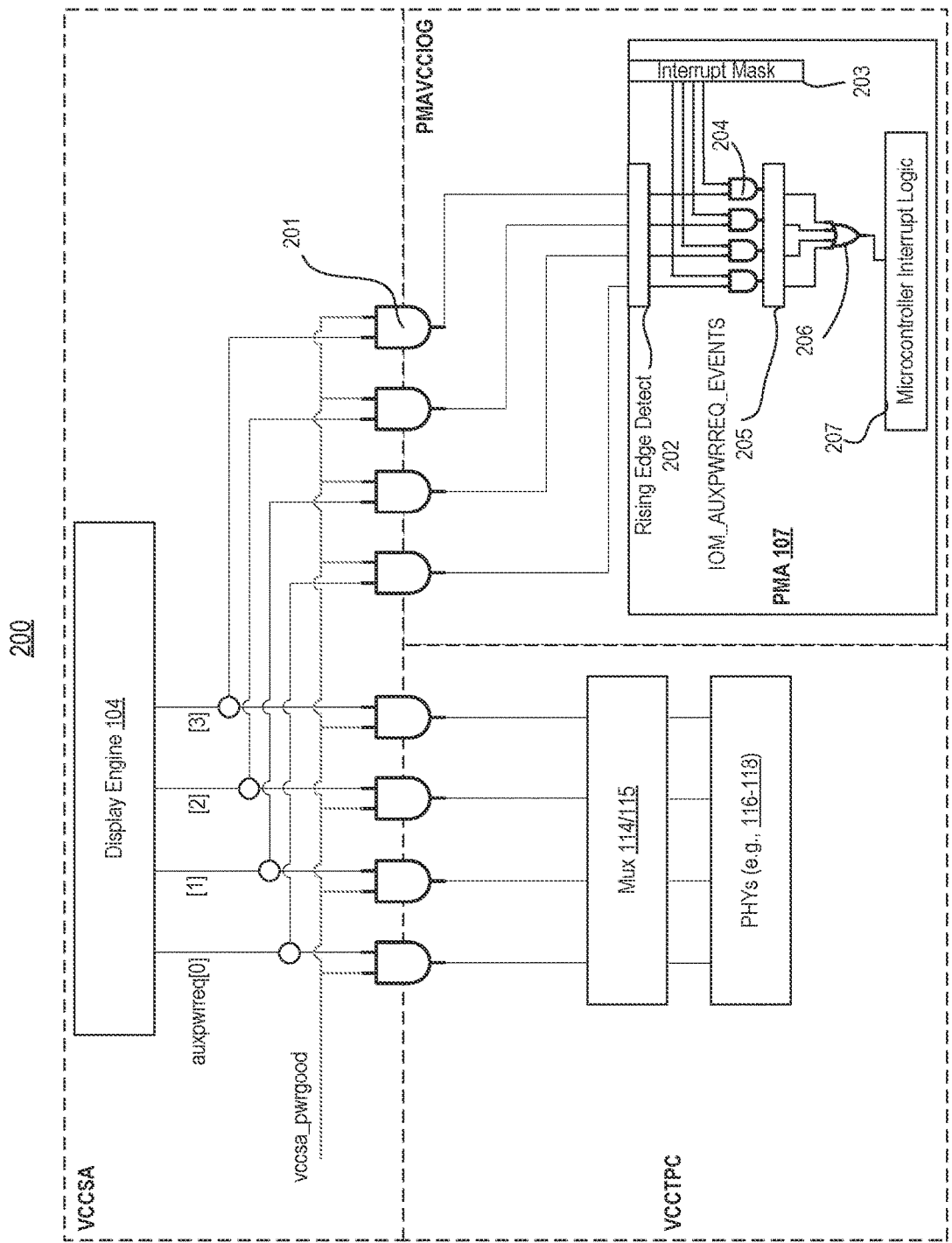
FIG. 2 illustrates hardware logic to identify when no fixed-port display is attached and when a fixed-port connected display is idle, in accordance with some embodiments.

FIG. 2 illustrates hardware logic 200 to identify when no fixed-port display is attached and when a fixed-port connected display is idle, in accordance with some embodiments. Hardware logic 200 described logic and circuitry in three different power domains: VCCSA, VCCTPC, and PMAPVCCIOG. These are just different power domains within the system-on-chip. In some embodiments, PMAPVCCIOG is an always-ON power domain, which means that while other power domains may be cut off during various power saving modes, power to PMAPVCCIOG remains on. In various embodiments, VCCTPC power domain can be turned off while processor 101 is in state C0.

In some embodiments, display engine 104 generates auxiliary power request signal (auxpwrreq) when any of the PHYs 116-119 is connected to a display. The auxiliary power request signal indicates to the USB subsystem that power is needed for the display and that the subsystem has to be in active state to service this request (or interrupt). As discussed herein, four PHYs 116-119 are illustrated which correspond to auxpwrreq[0]-[3] signals, respectively. For other number of PHYs, the number of corresponding auxpwrreq signals is modified. The signal auxpwrreq[i] (where 'i' is a number) is asserted upon a hot plug detect wake event on the fixed DP/HDMI ports due to a display connection to the one or more PHYs 116-119. The hot plug detect wake event results in an interrupt (auxpwrreq) that interrupts a display driver resulting in the assertion of auxpwrreq interface signal from display engine 104 (or display IP) to Type-C Subsystem. This interrupt is done to enable auxiliary channel in the PHY (e.g., 116-119) for transmitting/receiving DP protocol auxiliary commands with monitor.

In some embodiments, the auxpwrreq[0]-[3] signals are gated by a power good signal. The power good signal makes sure that false trigger of auxpwrreq[0]-[3] signals are not serviced. If VCCSA power level (e.g., voltage level) is above a threshold (e.g., over 70% of its target level), then Vccsa_pwrgood (power good signal) is asserted, which enables the AND gates 201. A person skilled in the art would appreciate that AND gates can be replaced with NAND, NOR gates, or multiplexers. The output of AND gates 201 is received by hardware logic of PMA 107 and multiplexers 114 and 115.

In some embodiments, hardware logic of PMA 107 comprises rising edge detect logic 202, interrupt mask registers 203, AND gate 204, registers 205 to store auxiliary power request events, OR gate 206, and microcontroller interrupt logic 207. In some embodiments, rising edge detect logic 202 monitors the output of AND gates 201 that determines whether any of the auxpwrreq signals asserted. In some embodiments, rising edge detect logic 202 comprises four registers to store the monitored result for each auxpwrreq signal, respectively. A register value of '1' indicates that auxpwrreq signal assertion is detected. However, the logic value for assertion can be inverted and other logic can be modified to process the inverted logic value to achieve the same functionality.

In some embodiments, interrupt mask logic 203 can be used to mask the output of the registers of edge detect logic 202. As such, interrupt mask logic 203 gives flexibility to prevent waking the SOC on auxpwrreq assertion if desired. Interrupt mask logic 203 also provides the flexibility for PMA 107 to allow or disallow event detection based on the boot time OEM (original equipment manufacturer) configuration of the ports—fixed DP vs flex Type-C Ports. For example, for flex Type-C ports, PMA 107 may not want to receive these events from display connections because the PMA 107 may have different means to learn about the new connections directly from the platform controller hub (PCH). Here, AND gates 204 receive outputs of registers of interrupt mask logic 203 and masks the output of the AND gate 204 when the bit to the input of the AND gate is '0'. A person skilled in the art can modify the AND logic gates 204 to NAND gates, NOR gates, or multiplexers and modify the masking logic 203 accordingly to mask the output of the NAND gates, NOR gates, or multiplexers.

The output of the AND gates 204 are stored in registers 205. If any of the registers 205 is a logic '1' that indicates the masked value or the rising edge detected signal, OR gate 206 triggers microcontroller 207 to handle the event. In some embodiments, the firmware running on microcontroller 207 brings the USB-C subsystem out of D3COLD state to a state where the USB-C subsystem is capable to handle the fixed display request and allow the connected monitor to light up. As discussed herein, a connected monitor on any one of PHYs 116-119 causes a corresponding auxpwrreq to assert which eventually results in microcontroller 207 exiting from the D3COLD power state. The D3COLD exit flow is driven by the USB-C PMA firmware and hardware to bring the USB-C subsystem back to a fully-on, D0 state. In some embodiments, if D3COLD feature is enabled by software (e.g., BIOS), the USB-C subsystem opportunistically tries to re-enter the D3COLD state while the SoC is active (e.g., PkgC 0+D0 state) to reduce power, when there the fixed/static ports aren't used.

Figure 3:
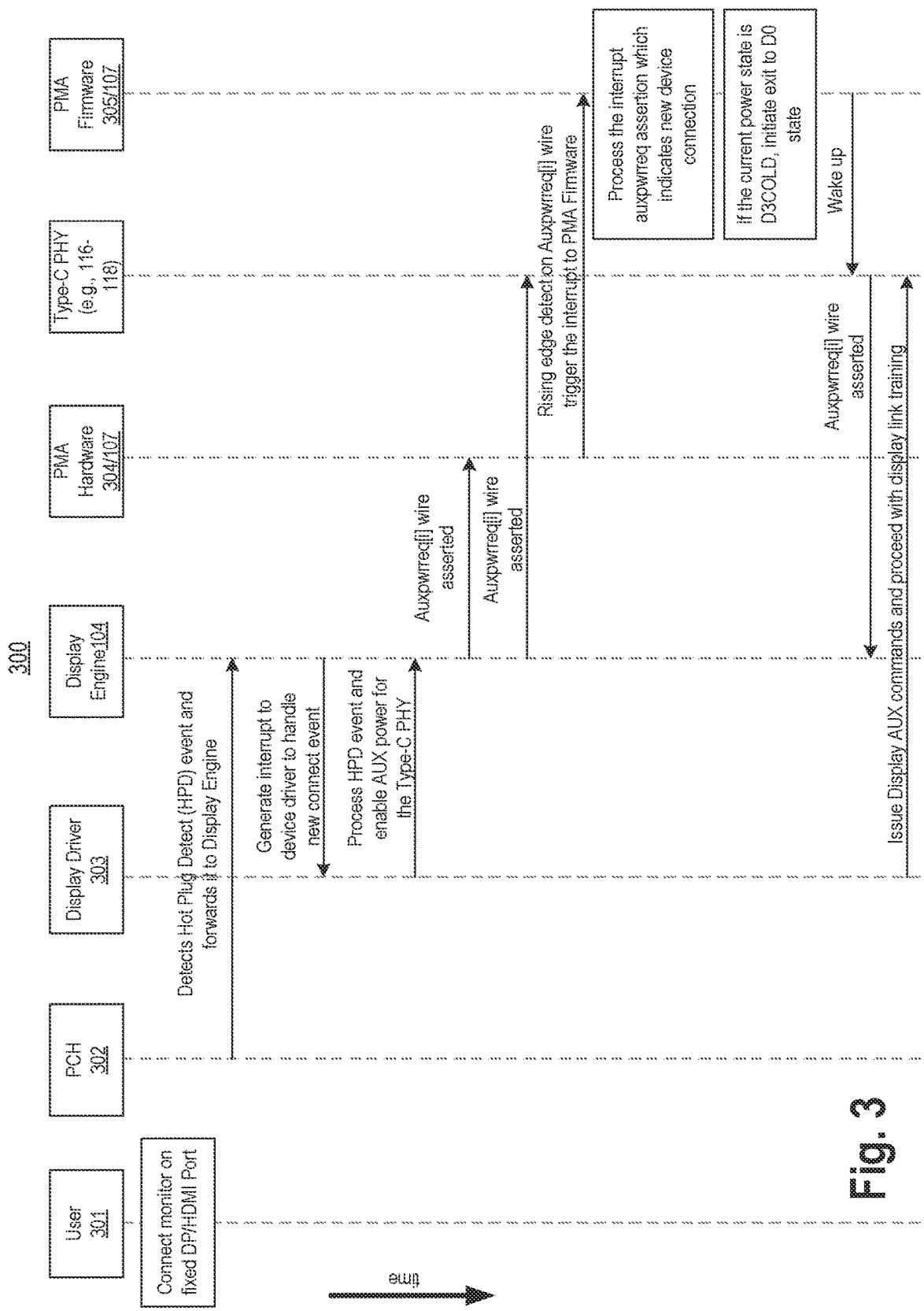
FIG. 3 illustrates a USB Type-C subsystem power management flow, in accordance with some embodiments.

FIG. 3 illustrates a USB Type-C subsystem power management flow 300, in accordance with some embodiments. In traditional USB Type-C subsystems when a device is connected to a Type-C PHY port, D3COLD power state is not achieved. As a result, there is a power tax on the computer system even when no display is attached to the PHY because entering and exiting D3COLD is not available in traditional USB Type-C subsystem. Various embodiments allow the USB-C subsystem to be completely shut off, thereby reducing power consumption, when there is no fixed port display attached to the USB Type-C PHY or when a fixed port connected display is idle. While the various embodiments are illustrated with reference to D3COLD state for the device low power state, the embodiments are not limited to that power state. Other low power states that allow a USB Type-C subsystem to reduce power consumption can be used with the hardware and software of various embodiments.

Here, y-axis is time and the x-axis indicates the various components. While the arrows indicating the flow of the power management are shown in a particular order, the order can be modified. For example, some processes can be performed in parallel. Some of the operations described here are performed by hardware, and some are performed by software. The software may execute on microcontroller 207, processor 101, or any suitable logic such as control hub 2432 of FIG. 4.

Referring back to FIG. 3, when user 301 connects a monitor on the fixed DP/HDMI ports (e.g., one of the repurposed USB Type-C PHYs 116-119), then platform controller hub (PCH) 302 detects a hot plug detect event and informs display engine 104 about the event. Display engine 104 then generates an interrupt to device driver 303 to handle the new connect event. Display driver 303 processes the hot plug detect event and enables auxiliary power (via auxpwrreq signal) for the Type-C PHY to which the monitor was connected by user 301. Display engine 104 asserts the auxpwrreq signal bit (auxpwrreq[i]) that corresponds to the Type-C PHY (e.g., one of 116-199). The auxpwrreq signal(s)

are provided to PMA hardware 304/107 as described with reference to FIG. 3. The auxpwrreq signal(s) are provided to multiplexers 114/115 and finally to the Type-C PHY which is connected to the monitor. Rising edge detection hardware 202 of PMA 107 detects the auxpwrreq signal bit (auxpwrreq[i]) and triggers the interrupt for processing by PMA firmware 305/107. The firmware executes on microcontroller 207, in accordance with some embodiments. PMA firmware 305/107 processes the interrupt from the assertion of the auxpwrreq signal bit (auxpwrreq[i]), which indicates a new device connection to one of the Type-C PHYs 116-119. Firmware 305/107 initiates exit to D0 state (active state) if the current power state is the low power D3COLD state. As a result, a wakeup signal is sent by firmware 305/107 to the Type-C PHY (e.g., one of 116-119) which is connected to the monitor. The wakeup signal causes auxpwrreq signal bit (auxpwrreq[i]) to be asserted.

Consequently, display driver 303 issues a display auxiliary (AUX) command and proceeds with display link training. Firmware 305/107 sequences the D3COLD exit, bringing the subsystem into a powered-on state, including USB-C PHY and waking up the USB-C controller(s) to service the auxpwrreq. The infrastructure to enable the USB-C subsystem to enter and exit D3COLD state autonomously allows for significant power savings which improves battery life and processor performance while the SoC is active or in PkgC0 state.

In some embodiments, the interaction between the various USB subsystem components happens without any high level SoC power management block or software interaction. For example, local drivers on microcontroller 207 of PMA 107 perform the power management without knowledge of power control unit (PCU) of the SoC.

FIG. 4 illustrates a smart device or a computer system or an SoC (System-on-Chip) having USB Type-C subsystem power management, in accordance with various embodiments. It is pointed out that those elements of FIG. 4 having the same reference numbers (or names) as the elements of any other figure can operate or function in any manner similar to that described, but are not limited to such.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises a SoC (System-on-Chip) 2401. An example boundary of the SOC 2401 is illustrated using dotted lines in FIG. 4, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Although merely three cores 2408a, 2408b, 2408c are illustrated in FIG. 4, processor 2404 may include any other appropriate number of processing cores, e.g., tens, or even hundreds of processing cores. Processor cores 2408a, 2408b, 2408c may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408a, a second section of cache 2406 dedicated to core 2408b, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, a cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, control hub 2432 provides a hardware-based wake detection and SoC firmware/software support, as discussed with reference to FIGS. 1-3, for servicing fixed display port (DP) and High Definition Multimedia Interface (HDMI) port hot plug events which allow a Universal Serial Bus (USB) Type-C subsystem to go into a powered off state (e.g., D3COLD state) while the fixed display is not streaming. Upon receiving a display software-initiated wake for fixed display streaming in response to a hot plug detect, the SoC USB Type-C firmware triggers exit low-power state flow to power up the USB USB Type-C subsystem to handle the display traffic. The SoC USB Type-C firmware has the capability to autonomously re-enter the low power state (e.g., D3COLD state) when the fixed display(s) are not streaming.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments, and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408a, 2408b, 2408c, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, constant-on-time controller based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410a/b and/or PMIC 2412. In some embodiments, each core has a network of distributed LDOs to provide efficient control for power management. The LDOs can be digital, analog, or a combination of digital or analog LDOs. In some embodiments, VR 2414 includes current tracking apparatus to measure current through power supply rail(s).

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410a. In an example, some other sections of PCU 2410 may be implemented outside the processing cores 2408, and these sections of PCU 2410 are symbolically illustrated using a dotted box and labelled as PCU 2410b. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456$a$, 2456$b$, 2456$c$. The OS 2452 may also include various drivers 2454$a$, 2454$b$, 2454$c$, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Various embodiments described herein are illustrated as examples. The features of these examples can be combined with one another in any suitable way. These examples include:

Example 1: An apparatus comprising: a display engine to generate an interrupt to a device driver in response to a display device being coupled to a port, wherein the device driver is to issue a power request for the display device; and a power management agent to detect the power request and exit a low power state to an active state.

Example 2: The apparatus of example 1, wherein the port is a USB Type-C port.

Example 3: The apparatus of example 1 comprises a platform controller hub to detect a hot plug event in response to the display device being coupled to the port.

Example 4: The apparatus of example 3, wherein the platform controller hub is to forward the hot plug event to the display engine, wherein the display engine is to generate the interrupt in response to reception of the hot plug event from the platform controller hub.

Example 5: The apparatus of example 1, wherein the power management agent comprises a rising edge detection logic to detect assertion of the power request.

Example 6: The apparatus of example 5, wherein the power management agent comprises registers to mask output of the edge detection logic.

Example 7: The apparatus of example 5, wherein the power management agent includes a microcontroller to service an output of the edge detection logic to generate wakeup signal.

Example 8: The apparatus of example 7, wherein the microcontroller executes a software to generate the wakeup signal.

Example 9: The apparatus of example 1, wherein the display driver trains a display link of the display device in response to exit of the low power state.

Example 10: The apparatus of example 1, wherein the low power state is a D3COLD state, and wherein the active state is one of a S0 state or a D0 state.

Example 11: A system comprising: a processor; a memory coupled to a processor; a fabric coupled to the processor and the memory; a display engine to generate an interrupt to a device driver in response to a display device being coupled to a port, wherein the device driver is to issue a power request for the display device; and a USB Type-C subsystem coupled to the fabric, wherein the USB Type-C subsystem comprises a power management agent to detect the power request and exit a low power state to enter an active state.

Example 12: The system of example 11, wherein the port is a USB Type-C port.

Example 13: The system of example 11 comprises a platform controller hub to detect a hot plug event in response to the display device being coupled to the port.

Example 14: The system of example 13, wherein the platform controller hub is to forward the hot plug event to the display engine, wherein the display engine is to generate the interrupt in response to reception of the hot plug event from the platform controller hub.

Example 15: The system of example 11, wherein the power management agent comprises: a rising edge detection logic to detect assertion of the power request; registers to mask output of the edge detection logic; and a microcontroller to service the output of the edge detection logic to generate wakeup signal, wherein the microcontroller executes a software to generate the wakeup signal.

Example 16: The system of example 11, wherein the display driver trains a display link of the display device in response to exit of the low power state.

Example 17: The system of example 11, wherein the low power state is a D3COLD state, and wherein the active state is one of a S0 state or a D0 state.

Example 18: A machine-readable storage media having machine readable instructions stored thereon that when executed cause a microcontroller to perform a method comprising: receiving an edge detection of a power request signal, wherein the power request signal is generated by a device driver in response to a display device being coupled to a port; and processing the power request signal by exiting a low power state to an active state.

Example 19: The machine-readable storage media of example 18 having machine readable instructions stored thereon that when executed cause the microcontroller to perform the method comprising: generating a wakeup signal to wake up from the low power state, wherein the wakeup signal wakes up a USB Type-C subsystem.

Example 20: The machine-readable storage media of example 18, wherein the port is a USB Type-C port, wherein the low power state is a D3COLD state, and wherein the active state is one of a S0 state or a D0 state.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a display engine to:
      generate an interrupt to a driver in response to a display device being coupled to a port, wherein the interrupt is to indicate to the driver to enable auxiliary power for the port; and
      issue, based on the enablement of auxiliary power for the port, a power request signal related to the display device; and
   a power management agent to detect the power request signal and, based on the power request signal, direct the port to exit a powered-off state to an active state.

2. The apparatus of claim 1, wherein the power request signal is an auxpwrreq power request signal.

3. The apparatus of claim 1, wherein the powered-off state is a D3 state.

4. The apparatus of claim 1, wherein the powered-off state is a state in which power is fully removed from the port.

5. The apparatus of claim 1, wherein the powered-off state is a state in which a Type-C controller related to a universal serial bus (USB) Type-C port are powered off.

6. The apparatus of claim 1, wherein the powered-off state is a state in which physical layer (PHY) elements related to a universal serial bus (USB) Type-C port are powered off.

7. The apparatus of claim 1, wherein the power management agent is further to place the port into the powered-off state.

8. A system comprising:
a universal serial bus (USB) Type-C port;
a display engine to issue, based on enablement of auxiliary power for the Type-C port, a power request signal related to a display device coupled with the Type-C port when the Type-C port is in a powered-off state; and
a power management agent to detect the power request signal and, based on the power request signal, direct the Type-C port to change from the powered-off state to an active state.

9. The apparatus of claim 8, wherein the power request signal is an auxpwrreq power request signal.

10. The apparatus of claim 8, wherein the powered-off state is a D3 state.

11. The apparatus of claim 8, wherein the powered-off state is a state in which power is fully removed from the port.

12. The apparatus of claim 8, wherein the powered-off state is a state in which a Type-C controller related to the Type-C port are powered off.

13. The apparatus of claim 8, wherein the powered-off state is a state in which physical layer (PHY) elements related to the Type-C port are powered off.

14. The apparatus of claim 8, wherein the power management agent is further to place the port into the powered-off state.

15. One or more non-transitory computer-readable storage media having machine readable instructions stored thereon that when executed cause a microcontroller to perform a method comprising:
receiving an edge detection of an auxpwrreq power request signal, wherein the auxpwrreq power request signal is generated by a device driver in response to a display device being coupled to a USB Type-C port; and
processing the auxpwrreq power request signal by exiting a powered-off state to an active state.

16. The one or more non-transitory computer-readable storage media of claim 15, wherein the active state is an S0 state or a D0 state.

17. The one or more non-transitory computer-readable storage media of claim 15, wherein the powered-off state is a D3 state.

18. The one or more non-transitory computer-readable storage media of claim 15, wherein the powered-off state is a state in which power is fully removed from the port.

19. The one or more non-transitory computer-readable storage media of claim 15, wherein the powered-off state is a state in which a Type-C controller related to the Type-C port are powered off.

20. The one or more non-transitory computer-readable storage media of claim 15, wherein the powered-off state is a state in which physical layer (PHY) elements related to the Type-C port are powered off.

* * * * *